(12) United States Patent
Dunn et al.

(10) Patent No.: US 7,127,309 B2
(45) Date of Patent: Oct. 24, 2006

(54) MODELING APPARATUS WITH TRAY SUBSTRATE

(75) Inventors: Benjamin N. Dunn, Savage, MN (US); Jerome W. Goetzke, Oakdale, MN (US); William J. Swanson, St. Paul, MN (US)

(73) Assignee: Stratasys, Inc., Eden Prairie, MN (US)

( * ) Notice: Subject to any disclaimer, the term of this patent is extended or adjusted under 35 U.S.C. 154(b) by 428 days.

(21) Appl. No.: 10/775,871

(22) Filed: Feb. 10, 2004

(65) Prior Publication Data

US 2005/0173855 A1   Aug. 11, 2005

(51) Int. Cl.
*B23Q 3/00* (2006.01)
*G06F 19/00* (2006.01)

(52) U.S. Cl. .................. 700/98; 700/119; 291/121.82; 269/47; 269/74; 269/291

(58) Field of Classification Search .................. 700/98, 700/119; 291/121.82; 264/219; 269/47, 269/59, 74, 100; 425/375
See application file for complete search history.

(56) References Cited

U.S. PATENT DOCUMENTS

| | | | |
|---|---|---|---|
| 1,685,899 A | 10/1928 | Andrew | |
| 1,799,374 A | 4/1931 | Hurley | |
| 2,547,211 A | 4/1951 | Holmes | |
| 3,775,644 A | 11/1973 | Cotner et al. | |
| 4,157,819 A | 6/1979 | Meyer | |
| 4,493,967 A * | 1/1985 | Wolfe .................... | 219/121.63 |
| 4,501,949 A * | 2/1985 | Antol et al. .......... | 219/121.63 |
| 4,749,347 A | 6/1988 | Valavaara | |
| 4,810,204 A | 3/1989 | Wilson | |
| 4,825,032 A * | 4/1989 | Duncan ................ | 219/121.63 |
| 5,121,329 A | 6/1992 | Crump | |
| 5,141,680 A | 8/1992 | Almquist et al. | |
| 5,143,817 A | 9/1992 | Lawton et al. | |
| 5,303,141 A | 4/1994 | Batchelder et al. | |
| 5,340,433 A | 8/1994 | Crump | |
| 5,764,521 A | 6/1998 | Batchelder et al. | |
| 5,939,008 A | 8/1999 | Comb et al. | |
| 5,961,107 A | 10/1999 | Morghen | |
| 6,367,791 B1 | 4/2002 | Calderon et al. | |
| 6,685,866 B1 * | 2/2004 | Swanson et al. ............ | 264/308 |
| 6,790,403 B1 * | 9/2004 | Priedeman et al. ......... | 264/442 |
| 2001/0038168 A1 * | 11/2001 | Popa et al. ................. | 264/308 |
| 2004/0222561 A1 * | 11/2004 | Hopkins ..................... | 264/308 |

FOREIGN PATENT DOCUMENTS

JP   62-206840   9/1987
JP   02-015927   1/1990

* cited by examiner

*Primary Examiner*—Leo Picard
*Assistant Examiner*—Sheela S. Rao
(74) *Attorney, Agent, or Firm*—Kinney & Lange, P.A.

(57) ABSTRACT

A modeling apparatus includes a platform and a substrate, which are adapted to be releasably locked together to provide a surface for building up models in an additive-process three-dimensional modeling machine. The substrate comprises a substantially rigid, non-dusting tray providing a modeling surface. Male connectors extending from the tray are seated in female connectors in the platform, to engage the substrate to the platform. The engaged substrate is locked to the platform, maintaining accurate positioning of the substrate while a model is built. After modeling is complete, the substrate is released from the platform, the model is removed, and the substrate may be reused.

62 Claims, 4 Drawing Sheets

MODELING APPARATUS WITH TRAY SUBSTRATE

BACKGROUND OF THE INVENTION

The present invention relates to the fabrication of three-dimensional objects using additive process modeling techniques. More particularly, the invention relates to modeling machines which form three-dimensional objects by depositing modeling material onto a substrate mounted to a modeling platform.

Additive process modeling machines make three-dimensional models by building up a modeling medium, usually in planar layers, based upon design data provided from a computer aided design (CAD) system. A mathematical description of a physical part to be created is split into (usually) planar layers, and those layers are individually shaped and applied to produce the final part. Three-dimensional models are used for functions including aesthetic judgments, proofing the mathematical CAD model, forming hard tooling, studying interference and space allocation, and testing functionality. The dominant application of layered manufacturing in recent years has been for rapid prototyping.

Examples of apparatus and methods for making three-dimensional models by depositing solidifiable modeling material are described in Crump U.S. Pat. No. 5,121,329, Batchelder, et al. U.S. Pat. No. 5,303,141, Crump U.S. Pat. No. 5,340,433, Batchelder, et al. U.S. Pat. No. 5,402,351, Crump et al. U.S. Pat. No. 5,503,785, Abrams et al. U.S. Pat. No. 5,587,913, Danforth, et al. U.S. Pat. No. 5,738,817, Batchelder, et al. U.S. Pat. No. 5,764,521 and Comb et al. U.S. Pat. No. 5,939,008, all of which are assigned to Stratasys, Inc., the assignee of the present invention. An extrusion head extrudes solidifiable modeling material in a fluent strand (also termed a "bead" or "road") from a nozzle onto a base. The base comprises a modeling substrate which is removably affixed to a modeling platform. The extruded material is deposited layer-by-layer in areas defined from the CAD model, as the extrusion head and the base are moved relative to each other by mechanical means in three dimensions. The finished model is removed from the substrate. A solidifiable material which adheres to the previous layer with an adequate bond upon solidification is used as the modeling material. Thermoplastic materials have been found particularly suitable for these deposition modeling techniques.

Other additive process manufacturing techniques similarly build-up models on a support surface, including depositing UV curable polymers as in Masters U.S. Pat. No. 5,134,569; jetting droplets of material as in Gothait U.S. Pat. No. 6,658,314; extruding a settable plastic in vertical strips as in Valaaara U.S. Pat. No. 4,749,347; laser welding deposition as in Pratt U.S. Pat. No. 5,038,014; stacking and adhering planar elements as in DiMatteo U.S. Pat. No. 3,932,923; and applying shaped layers of paper as in Hull U.S. Pat. No. 5,192,559.

The support surfaces or substrates used in additive process modeling techniques must stabilize a model as it is built and allow removal of the model when it is complete. Typically, it is preferred that a model under construction be strongly adhered to its modeling substrate. Strains generated within the modeling material tend to warp the deposited structures unless the structures are supported in their correct orientation. Strong adherence to the substrate serves to prevent warpage and avoid localized shrinkage in foundation layers. Also, in some deposition processes, there are external forces that act on the deposited structures, such as pull from an extrusion nozzle, and centripetal acceleration on parts that are not stationary. Adherence of the model to the substrate must be sufficient to resist these forces. Delamination of a foundation layer from the substrate during the building of the object can result in a total failure in forming the object.

Further, since the substrate is a defining surface for the object being built, the substrate itself must be held in a well-defined configuration. Typically, the substrate is held in a configuration approximating a plane.

In rapid prototyping systems sold by Stratasys, Inc., a preferred substrate material has been a polymer foam. The porosity and compressibility of foam allows foundation layers of modeling material to be buried into the foam, which increases stability of the model as is it built up. The Crump '329 and '433 patents disclose a foam plastic material for use as a modeling substrate. A blue polystyrene material manufactured by Dow-Corning Corp. under that name and having a compression strength of 30 psi is identified as particularly suitable coarse, porous structure.

The foam substrate has been mounted onto a tray outside of the modeling machine, with spears inserted through side walls of the tray and pressed into the foam to engage the foam from all sides. The tray is then placed on the modeling platform within the modeling machine, and locked into place. After the object is formed, the tray is removed from the modeling machine and the foam is broken away from the object.

More recently, Stratasys® modeling machines have used a foam slab mounting system which eliminates the use of the tray and spears. This slab substrate mounting system is disclosed in Calderon et al. U.S. Pat. No. 6,367,791, also assigned to Stratasys, Inc., which describes that a slab substrate (e.g., foam) is mounted in a modeling machine by sliding it between two parallel rails having knife edges which cut into the sides of the substrate.

The Stratasys® modeling machines have also used a flexible sheet substrate held down on a platform by vacuum forces, as is disclosed in the Comb et al. '008 patent.

The Crump '329 and '433 patents further disclose modeling on a wire mesh sandpaper substrate, and on a water-soluble wax. The Batchelder et al. '521 patent discloses a sheet of magnetic material for use as a modeling substrate, wherein the modeling platform includes a magnet for attracting the sheet.

While foam substrates have found substantial use, the foam materials used in the prior art produce dust when broken away from the object. The presence of dust creates a risk that the dust may contaminate bearings and bushings in the modeling machine. Also, the foam is not reusable, due to foundation layers being buried into the foam. Thin-sheet substrates produce no dust, but have required hold-down systems which add cost, size and weight to the modeling machine.

SUMMARY OF THE INVENTION

The present invention is an apparatus for removably mounting a substrate to a modeling platform in an additive-process three-dimensional modeling machine. The apparatus of the present invention includes a platform and a substrate, which are adapted to be releasably locked together to provide a surface for building up models in a three-dimensional modeling machine.

The substrate is a substantially rigid tray providing a modeling surface. The platform includes a means for securing the substrate, and the substrate includes a means for engaging the means for securing the substrate. In the exemplary embodiments, the means provided on the platform are keyholes and the means provided on the substrate are projections that engage with corresponding keyholes in the platform. A locking means secures the substrate to the platform in a connected position, wherein the projections are seated in the keyholes.

In the exemplary embodiments, the substrate further includes a handle for ease of use and an outward-extending tab which allows identification of the mounted substrate by the machine. Also in the exemplary embodiments, the modeling surface of the substrate includes a grid.

The substrate is mounted in the modeling machine by positioning the substrate on the platform so that each projection fits through the corresponding keyhole, and sliding the substrate along the platform until the projections are fully seated in the keyholes. The engaged substrate is then locked into position. Optionally, the modeling machine may execute a substrate detection routine which identifies the substrate on the platform by detecting the presence of the tab.

DETAILED DESCRIPTION OF THE PREFERRED EMBODIMENTS

Figure 1:
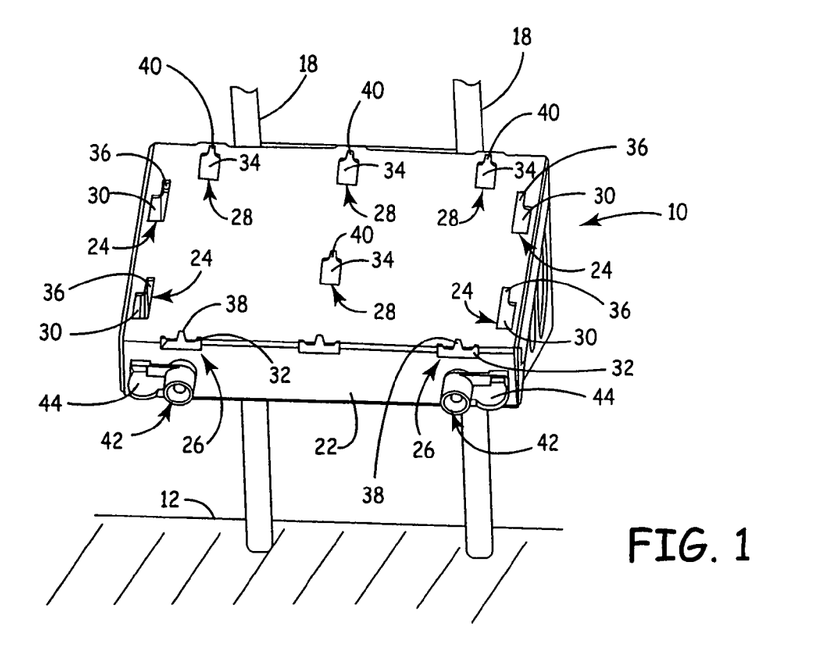
FIG. 1 is a perspective view of a modeling apparatus according to the present invention, with the substrate removed.
Figure 2:
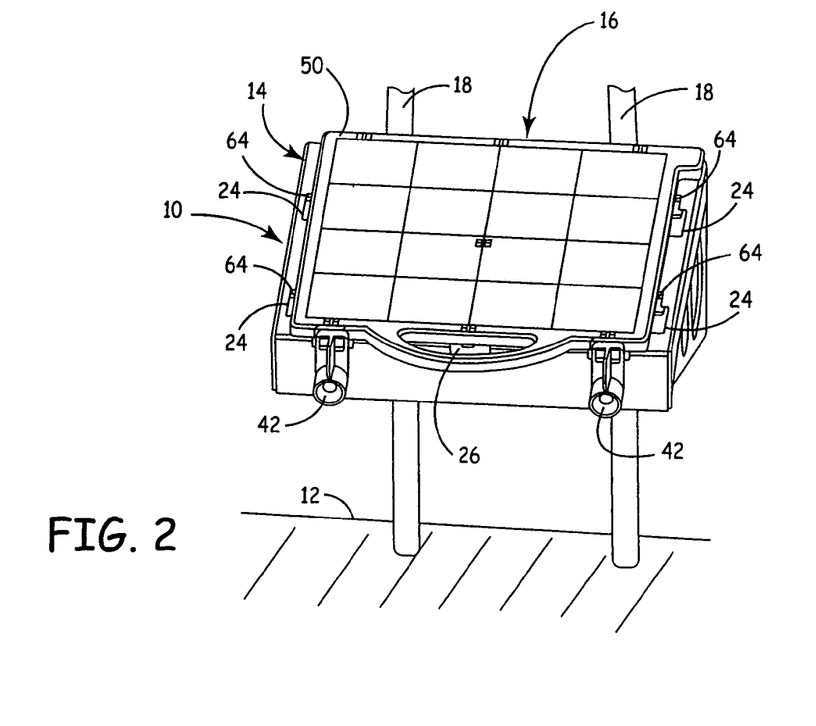
FIG. 2 is a perspective view of a modeling apparatus according to the present invention, with the substrate mounted on the platform.

The present invention is now described with reference to exemplary embodiments. An exemplary embodiment of the present invention is shown in FIGS. 1 and 2 as modeling apparatus 10 within modeling machine 12. As described herein, the modeling machine 12 is a fused deposition layered manufacturing machine of the type disclosed in U.S. Pat. No. 5,121,329, which builds three-dimensional objects by depositing molten modeling material in horizontal layers from an extrusion head. It should be understood, however, that the teachings of this invention can be used to advantage in other types of additive process three-dimensional modeling machines, such as those identified in the background section herein.

The modeling apparatus 10 is comprised of a modeling platform 14 and a removable substrate 16. The modeling machine 12 comprises a controller (not shown) and a z-lift 18, which is coupled to the modeling platform 14 and moves the platform 14 along a z-axis of the machine 12 in response to signals from the controller.

The platform 14 and the substrate 16 are adapted to be releasably locked together in a connected position, wherein the substrate 16 is supported in a defined configuration on the platform 14. In the exemplary embodiment, the substrate 16 includes male connectors which engage female connectors integral with the platform 14. FIG. 2 shows the substrate 16 and the platform 14 in their connected position, while FIG. 1 shows the platform 14 without the substrate 16.

Figure 7:
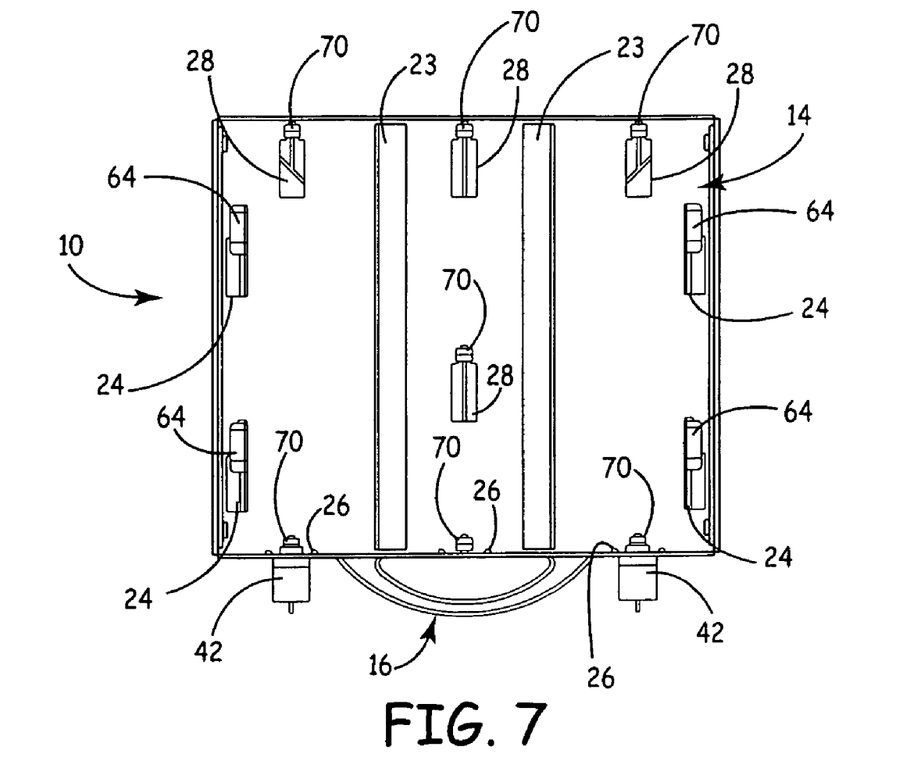
FIG. 7 is a bottom plan view of the substrate engaged in the platform.

The platform 14 comprises a horizontal top surface 20 which supports the substrate 16, and an adjoining front edge 22. As shown in FIG. 7, the underside of platform 14 is reinforced with two plates 23 to assist in keeping the top surface 20 flat. The top surface 20 has a plurality of keyholes there through used for engaging and securing the substrate. In the embodiment shown, the keyholes take one of three shapes, with each keyhole having an opening and a depending slot. There are four L-shaped keyholes 24 positioned opposite one another in pairs adjacent right and left sides of the platform 14, three W-shaped keyholes 26 spaced along the front edge 22, a centrally located T-shaped keyhole 28, and three T-shaped keyholes 28 spaced across the rear of the platform 14. The keyholes 24, 26 and 28 have openings 30, 32 and 34, respectively, which are forward of the respective depending slots 36, 38 and 40. The keyholes have a complimentary shape to projections on the substrate.

Figure 8:
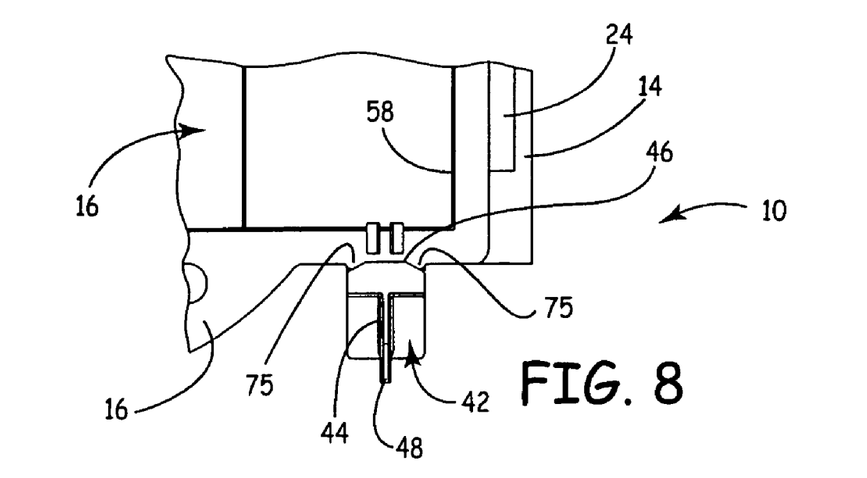
FIG. 8 is a detailed view of a locking mechanism according to the present invention.

A pair of retainers 42 are mounted to the platform 14 on its front surface 22. As is best shown in FIG. 8, each retainer 42 comprises a grip 44 and a rearward facing shoulder 46, and is pivotably mounted to the front surface 22 by a fastener 48.

As is best shown in FIGS. 3–6, the substrate 16 comprises a tray 50, a handle 56, and spaced projections 64 and 70. As shown, the handle 56 extends from a front edge of the tray 50, providing ease of use. The tray 50 has an upward-facing, substantially flat modeling surface 52, which has a texture selected for desired adherence and release characteristics according to the particular modeling process parameters and modeling material used to build models on the substrate 20. The texture may range from smooth (rms roughness less than about 0.001 in.) to rough (rms roughness greater than about 0.001 in.). In modeling with ABS plastic modeling material and Waterworks™ soluble support material available from Stratasys, Inc., a rough finish, specifically, a medium-course EDM finish, was found suitable. The modeling surface 52 optionally includes a grid 58, defined by grooves in the modeling surface. The grid 58 facilitates accuracy in the positioning of models on the substrate 16.

The tray 50 of the substrate 16 is substantially rigid so as to adequately support a model under construction, yet it can be flexed slightly so as to assist in releasing a completed model from the substrate 16. A matrix of ribs 60 forming the underside of the tray 50 provide strength to maintain the flat modeling surface 52, yet enable slight flexing of the substrate 16. It should be understood that the ribs 60 are only one of many ways to achieve a flat modeling surface and desired stiffness (e.g., the tray may be made from a stronger material or it may be made a uniform greater thickness). It should be further understood that a substrate according to the present invention need not have the ability to flex, so long as a completed model can be removed from the substrate by some method.

The projections 64 and 70 of the substrate 16 extend from the underside of the tray 50, and provide a means for securing the substrate 16 to the modeling platform 14. The projections 64 and 70 are configured to be seated in an engaged position in corresponding keyholes in the platform 14, as is best shown in FIG. 7. More specifically, four projections 64 are positioned opposite one another in pairs along right and left edges of the tray 50, and are configured to be engaged in the keyholes 24. Seven projections 70 extend from the underside of the tray 50, configured to be engaged in the keyholes 26 and 28. As shown, three projections 70 are disposed adjacent the front edge of the tray 50 for engagement in keyholes 26, three projections 70 are disposed adjacent a rear edge of the tray 50 for engagement in rear keyholes 28, and one projection 70 is centrally located for engagement in the centrally located keyhole 28.

Figure 5:
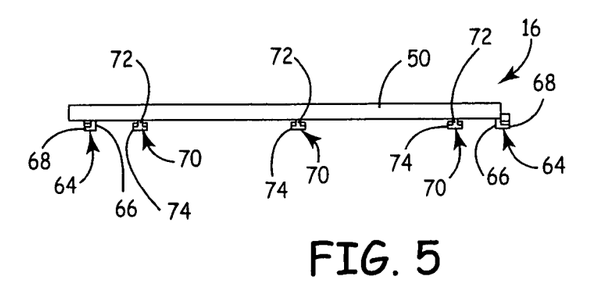
FIG. 5 is a rear elevation view of the substrate shown in FIG. 3.
Figure 6:
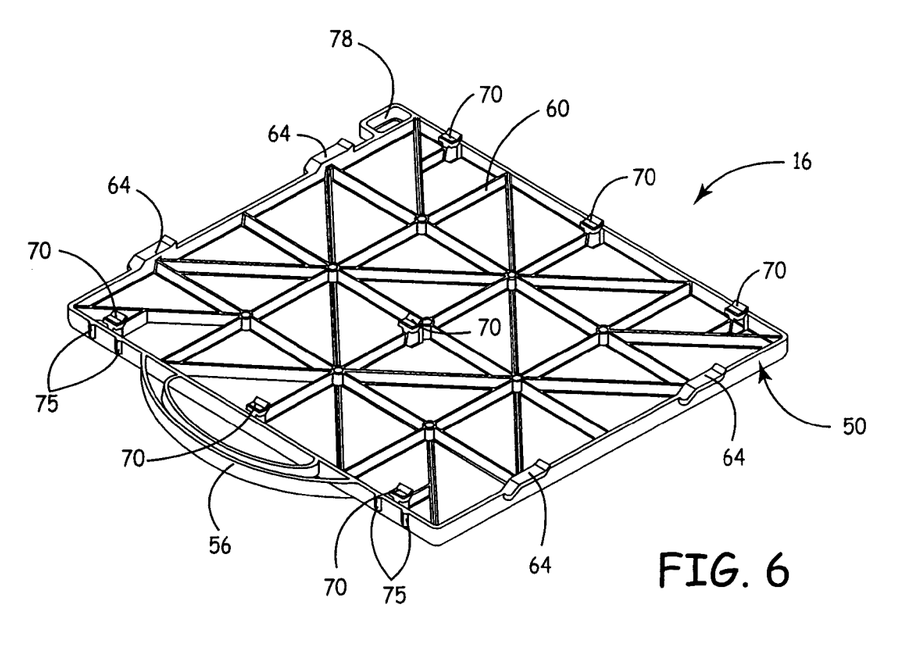
FIG. 6 is a perspective view of the bottom of the substrate shown in FIG. 3.

The projections 64 each have a leg portion 66 and a foot portion 68, in an "L" profile (see FIG. 5). The projections 70 each have a leg portion 72 and a foot portion 74, in a "T" profile (see FIG. 5). The foot portions 68 and 74 are sized to fit through the opening of their corresponding keyhole and the leg portions 66 and 72 are sized to fit into the depending slot of said keyhole, such that the projections are engaged in the keyholes when the foot portions are located beneath the top surface of the platform and the leg portions are seated in the slots. The foot portions of the projections 64 and 70 restrain vertical movement of the substrate 16, while the leg portions position the substrate 16 on the platform 14 and restrain forward and lateral movement. The positioning of projections 64 along the side edges of the tray 50 particularly provides resistance against curl forces imparted by a model during the build process.

For building in a heated environment, the projections and keyholes are sized to permit thermal expansion while maintaining position of the substrate. Specifically, in the exemplary embodiment, the slots 38 and 40 of the keyholes 26 and 28 positioned at the front center and rear center of the platform, respectfully, are sized to tightly engage their corresponding projections 70, thereby controlling positioning of the substrate 16. All other slots 36, 38 and 40 are sized larger than their corresponding projections 64 and 70, to accommodate thermal expansion of the substrate 16.

The substrate 16 further comprises a pair of detents 75 and an extension tab 78. The detents 75 are positioned on the front edge of the tray 50 to engage the retainers 42, so as to prevent the substrate 16 from slipping out the way it was inserted. The extension tab 78 is an extension of the substrate 16 which allows the modeling machine 12 to detect that a tray substrate according to the present invention is mounted in the modeling machine 12. The modeling machine 12 is programmed with a substrate detection routine which identifies the substrate 16 by detecting the extension tab 78, and responsively configures operating parameters of the machine, such as the base layer material, extrusion speed, extrusion temperature and extrusion tip height. This feature is useful where the modeling platform is configured to permit the use of multiple types of substrates, such as a tray substrate and a foam substrate, as it allows the modeling machine to automatically adjust its settings for the detected substrate type.

An exemplary substrate detection routine may be performed using a sensing apparatus disclosed in U.S. Pat. No. 6,629,011, assigned to Stratasys, Inc. and hereby incorporated by reference as if set forth fully herein. The sensing apparatus includes a plunger and a sensor coupled to the extrusion head of a three-dimensional modeling machine, which are known in the art for use in finding a z-start position of a modeling platform by detecting the top surface of a substrate mounted on the platform. To detect the top surface of the substrate, the plunger is positioned over the substrate, the platform is driven upward, and the sensor emits a signal when it detects that the substrate mounted on the platform has pushed the plunger to a sensing location. By monitoring the z-axis coordinate of the platform at the time the signal is emitted, the height of the substrate can be calculated.

In the present invention, the sensing apparatus as disclosed in the '011 patent can be used to determine whether or not the extension tab 78 is present at a predetermined location on the platform 16. Specifically, the substrate detection routine of the present invention can be implemented by positioning the plunger in a first location over the substrate, driving the substrate against the plunger, recording the z-axis coordinate of the platform when the detection signal is emitted, then moving the plunger to a second location where the extension tab 78 is expected (if it exists on the mounted substrate). The platform is driven upward to just beyond the previously recorded z-axis coordinate. If the extension tab 78 is present on the substrate, the substrate will contact the plunger and be detected by the sensor. If the extension tab 78 is not present, the plunger will not be contacted and the sensor will not emit a detection signal. When the tab 78 is detected, the modeling machine 12 configures its settings for modeling on a tray substrate. When the tab 78 is not detected, the modeling machine 12 configures its settings for modeling on a foam substrate.

Figure 3:
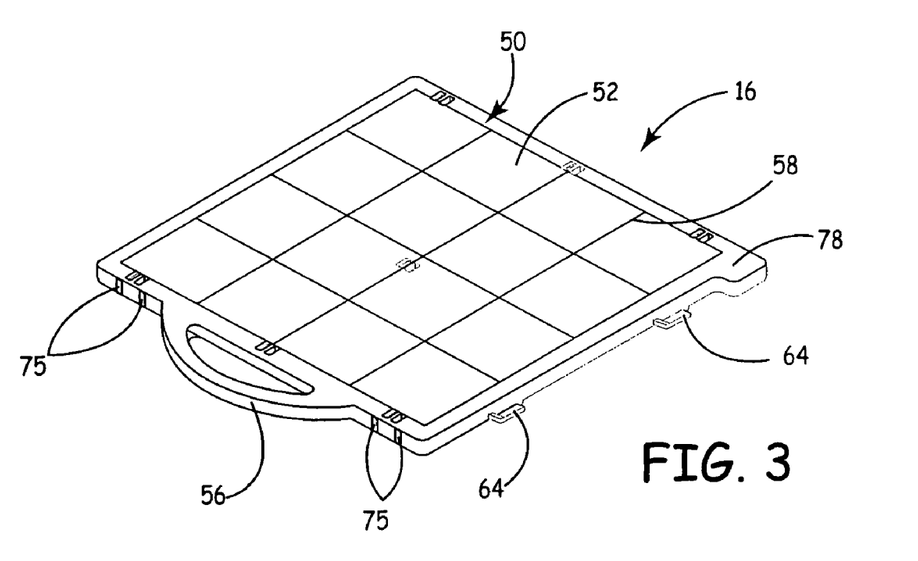
FIG. 3 is a perspective view of an exemplary substrate according to the present invention.
Figure 4:
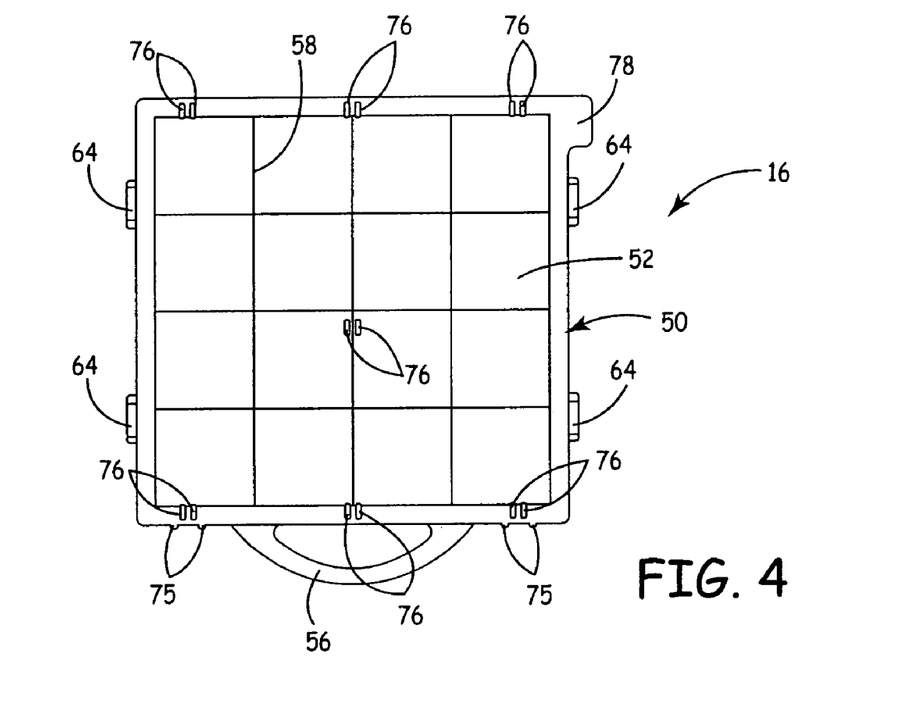
FIG. 4 is a top plan view of the substrate shown in FIG. 3.

As shown in FIGS. 2–4, several pairs of rectangular holes 76 extend through the substrate 16. The holes 76 were included to simplify the manufacture of the substrate 16 by injection molding. In building a model on the substrate 16, the modeling machine 12 can be programmed to either avoid or minimize the amount of material deposited on the holes 76. Those skilled in the art will recognize that a substrate according to the present invention could be manufactured without inclusion of the holes 76, by injection molding or by other techniques, thereby eliminating any concern in regards to the placement of material on the substrate.

An ABS plastic injection-molded substrate, according to the exemplary embodiment, has been successfully utilized in practicing the present invention, in a Stratasys® FDM® modeling machine. As will be recognized by those skilled in the art, the substrate of the present invention may be formed of other plastics, metals, composite materials, or any other substantially rigid, preferably non-dusting, material that will properly support the building of a three-dimensional model according the particular additive process method practiced by the modeling machine. The substrate may be a unitary injection molded part as is shown, or it may be comprised of assembled components. For example, the handle and projections may be attached to a separately molded tray. Similarly, the substrate may be made from a single material or it may have component parts made from different materials. For instance, the handle can be made from a material having lower thermal conductivity than the tray.

Those skilled in the art will recognize that numerous variations in the configuration of the platform and the keyholes are possible, so long as the platform will engage and support a tray substrate in a defined configuration on which to build a model. Likewise, numerous variations in the configuration of the substrate and its projections are possible, so long as the substrate will connect to the platform and support a model under construction. For example, different numbers of projections and keyholes may be used, and different placement may be selected. Further, the platform may include projections while the substrate has keyholes. Those skilled in the art will moreover recognize that other types of connectors can be used in practicing the present invention, including many other known types of male and female connectors that may be made integral with the substrate and the platform. It will also be apparent to those skilled in the art that alternate means may be used to lock the substrate in place, including locking mechanisms automatically activated by the modeling machine. In addition, the present invention may be practiced without using a separate locking mechanism, where the connectors engaging the substrate and the platform perform the function of the locking mechanism (i.e., fully restraining the substrate). Importantly, the substrate must be secured in a defined position on the platform and prevented from moving in any direction during modeling, and removed thereafter.

In addition, alternative substrate extensions may be used in place of tab 78, so long as the substrate includes an outward extension which can be automatically detected by a routine performed by the modeling machine.

In use, the substrate 16 is mounted in the modeling machine 12 by placing the substrate 16 on the platform 14, with each of the projections 64 and 70 aligned with the corresponding keyhole 24, 26 or 28. Advantageously, the projections 64 are visible to the user, providing ease of alignment. Initially, the substrate 16 is in a forward position on the platform 14, allowing the feet of projections 64 and 70 to drop into the openings of keyholes 24 and 28. Then, the user slides the substrate 16 along the platform 14 until all projections are fully seated in the keyholes, thereby engaging the substrate 16 with the platform 14. The user then locks the engaged substrate 16 onto the platform 14, by rotating each retainer 42 upward until the shoulder 46 of the retainer 42 is abutted in the corresponding detents 75 on the substrate 16.

Once the substrate 16 is secured on the platform 14, the machine 12 can perform the substrate detection routine. After detecting the presence of the extension tab 78, the machine 12 will responsively configure the operating parameters and it can proceed to build a model on the modeling surface 52 of the substrate 16.

After the model is built, the user removes the substrate 16 from the platform 14, and removes the model from the modeling surface 52. If the substrate 16 is not damaged by the removal process or the modeling process, it may be reinserted in to the machine 12 and reused in subsequent build jobs.

Exemplary models accordingly to the present invention were built in a Stratasys® Prodigy FDM® machine using an ABS plastic modeling material and Waterworks™ soluble support material. The ABS plastic was found to adhere to the modeling surface of a substrate having an EDM surface finish roughness of 47R-Max, at an ordinary extrusion temperature of 270° C. The Waterworks™ material did not adhere to this substrate at its ordinary extrusion temperature of 250° C., but it did adhere at an elevated extrusion temperature of 280° C. Accordingly, the tray substrate apparatus of the present invention was successfully utilized by extruding base layers of support material at the elevated temperature, and extruding subsequent layers at the ordinary temperature. Models were released from the substrate by placing the substrate with the attached model into a cleaning tank, which dissolved away the support material adhering the model to the substrate. Flexing the substrate was also used to release models from the substrate, either as the sole release technique or in combination with use of the cleaning tank.

Although the present invention has been described with reference to preferred embodiments, workers skilled in the art will recognize that changes may be made in form and detail without departing from the spirit and scope of the invention. For instance, in the exemplary embodiments, the modeling platform 14 is movable in a vertical z-direction. It will be understood by those skilled in the art, however, that in alternative implementations the platform may be stationary, may move in other directions, or may have a different spatial orientation, to create three-dimensional objects by an additive process technique.

The invention claimed is:

1. In an additive process three-dimensional modeling machine, the improvement comprising:
    a platform for supporting a modeling substrate, the platform including a plurality of keyholes; and
    a substantially rigid substrate having a modeling surface and a plurality of projections, each projection configured to be removably seated in a corresponding one of the keyholes so as to engage the substrate and the platform in a connected position; and
    a locking mechanism for securing the substrate to the platform in the connected position, by preventing relative movement between the substrate and the platform when the substrate projections are engaged in the keyholes.

2. The modeling machine of claim 1, wherein the platform moves along a z-axis in the modeling machine.

3. The modeling machine of claim 1, wherein the substrate is comprised of plastic.

4. The modeling machine of claim 1, wherein the substrate is formed of molded plastic.

5. The modeling machine of claim 1, wherein the modeling surface of the substrate has a texture.

6. The modeling machine of claim 5, wherein the texture is rough.

7. The modeling machine of claim 5, wherein the texture is smooth.

8. The modeling machine of claim 5, wherein the texture is a medium-course EDM finish.

9. The modeling machine of claim 1, wherein the modeling surface of the substrate includes a grid.

10. The modeling machine of claim 9, wherein the grid is defined by grooves in the modeling surface.

11. The modeling machine of claim 1, wherein the modeling surface is substantially flat.

12. The modeling machine of claim 1, wherein the substrate further comprises a handle.

13. The modeling machine of claim 1, wherein the substrate further comprises an extension tab, and wherein the modeling machine is programmed with a substrate detection routine which identifies the substrate on the platform by detecting the extension tab, and responsively configures operating parameters of the machine.

14. The modeling machine of claim 1, wherein the locking mechanism comprises at least one retainer rotatably mounted on an edge of the platform.

15. The modeling machine of claim 1, wherein the substrate further comprises at least one detent on an edge of the substrate, positioned to engage the at least one retainer.

16. The modeling machine of claim 1, wherein the keyholes each have an opening and a depending slot, and wherein the projections each have a leg and a foot portion, with each foot portion being sized to fit through the opening of its corresponding keyhole and each leg portion being sized to fit into the depending slot of said keyhole, such that the projections are engaged in the keyholes when the foot portions are located beneath the top surface of the platform and the leg portions are seated in the slots.

17. The modeling machine of claim 16, wherein the openings of the keyholes are forward of their respective slots.

18. For use in a three-dimensional modeling machine, an apparatus comprising:
a platform having a plurality of female connectors through a surface thereof;
a substantially rigid, non-dusting substrate adapted to be releasably secured to the platform in a connected position wherein the substrate is supported in a defined configuration on the surface of the platform, the substrate having an outward-facing, substantially flat modeling surface and a plurality of male connectors configured to be seated in an engaged position in corresponding ones of the female connectors; and
a locking mechanism for preventing relative movement between the substrate and the platform when the male connectors are seated in the female connectors.

19. The apparatus of claim 18, wherein the substrate is comprised of plastic.

20. The apparatus of claim 18, wherein the substrate is formed of molded plastic.

21. The apparatus of claim 18, wherein the modeling surface of the substrate has a texture.

22. The apparatus of claim 21, wherein the texture is rough.

23. The apparatus of claim 21, wherein the texture is a medium-course EDM finish.

24. The apparatus of claim 18, wherein the modeling surface of the substrate includes a grid.

25. The apparatus of claim 18, wherein the substrate further comprises a handle.

26. The apparatus of claim 25, wherein the handle extends from a front edge of the substrate.

27. The apparatus of claim 25, wherein the handle has a thermal conductivity lower than that of the modeling surface.

28. The apparatus of claim 18, wherein the substrate is reusable.

29. The apparatus of claim 18, wherein the locking mechanism comprises at least one retainer rotatably mounted on an edge of the platform.

30. The apparatus of claim 29, wherein the substrate further comprises at least one detent on an edge of the substrate, positioned to engage the at least one retainer.

31. The apparatus of claim 18, wherein the female connectors are keyholes each have an opening and a depending slot and the male connectors are projections comprising a leg portion and a terminal foot portion, with each foot portion being sized to fit through the opening of its corresponding keyhole and each leg portion being sized to fit into the depending slot of said keyhole, such that the projections are engaged in the keyholes when the foot portions are located beneath the top surface of the platform and the leg portions are seated in the slots.

32. The apparatus of claim 31, wherein the openings of the keyholes are forward of their respective slots.

33. For use in a three-dimensional modeling machine, an apparatus comprising a platform and a substrate,
the platform and the substrate being adapted to be releasably locked together in a connected position, wherein the substrate is supported in a defined configuration on the platform such that a modeling surface of the substrate faces outward;
said platform including a means for securing the substrate in the connected position; and
said substrate comprising a substantially rigid, non-dusting tray providing the modeling surface, and integral means for engaging the means for securing the substrate.

34. The apparatus for claim 33, and further comprising:
locking means for preventing relative movement between the substrate and the platform in their connected position.

35. The apparatus of claim 34, wherein the means for securing the substrate comprises a plurality of keyholes, each having an opening and a depending slot.

36. The apparatus of claim 35, wherein the means for engaging the means for securing the substrate comprises a plurality of projections, each having a leg portion and a terminal foot portion, with each foot portion being sized to fit through the opening of an associated one of the keyholes and each leg portion being sized to fit into the depending slot of said keyhole, such that the platform and the substrate are in the connected position when the foot portions of the projections are located beneath the top surface of the platform and the leg portions are seated in the slots.

37. The apparatus of claim 33, wherein the substrate further comprises a handle.

38. For use in an additive process three-dimensional modeling machine of the type which builds models on a substrate supported by a modeling platform, a substrate comprising:
a substantially rigid, non-dusting tray having a substantially flat modeling surface, the modeling surface having a texture; and
a plurality of spaced male connectors extending from the tray for engaging the modeling platform.

39. The substrate of claim 38, wherein the substrate is comprised of plastic.

40. The substrate of claim 38, wherein the substrate is a unitary injection molded part.

41. The substrate of claim 38, wherein the texture of the modeling surface is smooth.

42. The substrate of claim 38, wherein the texture of the modeling surface is a medium-course EDM finish.

43. The substrate of claim 38, wherein the modeling surface includes a grid.

44. The substrate of claim 43, wherein the grid is defined by grooves in the modeling surface.

45. The substrate of claim 38, and further comprising a handle integral with the tray.

46. The substrate of claim 38, and further comprising a tab extending outward from the tray.

47. The substrate of claim 38, wherein the substrate is reusable.

48. The apparatus of claim 38, wherein the male connectors comprise projections each having a leg portion and a terminal foot portion.

49. In an additive process three-dimensional modeling machine, the apparatus comprising:
a platform;
a substantially rigid, non-dusting substrate having a modeling surface;
means integral with the platform for engaging the substrate on the platform in a connected position wherein the modeling surface of the substrate faces outward; and
means integral with the substrate for engaging the means integral with the platform.

50. The apparatus of claim 49, wherein the means integral with the platform comprises female connectors.

51. The apparatus of claim 50, wherein the female connectors are keyholes.

52. The apparatus of claim 51, wherein the means integral with the substrate comprises male connectors.

53. The apparatus of claim 52, wherein the male connectors comprise projections configured to be removably engaged in corresponding ones of the keyholes, the projections each having a leg portion and a terminal foot portion.

54. The apparatus of claim 49, and further comprising:
   locking means for preventing relative movement between the substrate and the platform in their connected position.

55. The apparatus of claim 49, wherein the substrate is reusable.

56. The apparatus of claim 49, and further comprising a handle integral with the substrate.

57. The apparatus of claim 49, wherein the substrate further comprises a tab extending outward therefrom.

58. A method for loading a modeling substrate in an additive process three-dimensional modeling machine, comprising the steps of:
   providing a platform for supporting a substrate, the platform having a plurality of female connectors through a surface thereof;
   providing a substantially rigid, non-dusting substrate having a modeling surface and a plurality of integral male connectors, each male connector configured to be seated in an engaged position in a corresponding one of the female connectors;
   seating the male connectors in the corresponding female connectors; and
   locking the substrate onto the platform.

59. The method of claim 58, wherein the female connectors are keyholes and the male connectors are projections comprising a leg portion and a terminal foot portion.

60. The method of claim 59, wherein the step of engaging comprises:
   positioning the substrate on the platform so that each projection fits through the corresponding keyhole; and
   sliding the substrate along the platform until the projections are fully seated in the keyholes.

61. The method of claim 58, wherein the substrate futher has a tab extending outward therefrom, and further comprising the step of:
   identifying the substrate on the platform by detecting the presence of the tab.

62. The method of claim 58, and further comprising the steps of:
   building a model on the modeling surface of the substrate;
   removing the substrate from the platform after building the model;
   removing the model from the modeling surface of the substrate;
   repeating the steps of engaging and locking; and
   reusing the substrate for building subsequent models.

\* \* \* \* \*